United States Patent [19]
Hua

[11] Patent Number: 6,118,673
[45] Date of Patent: Sep. 12, 2000

[54] SINGLE-STAGE AC/DC CONVERTERS WITH SATURABLE CONDUCTOR PFC

[75] Inventor: Guichao Hua, Blacksburg, Va.

[73] Assignee: Virginia Power Technologies, Inc., Blacksburg, Va.

[21] Appl. No.: 09/088,240

[22] Filed: Jun. 1, 1998

[51] Int. Cl.[7] .................................................. H02M 3/335
[52] U.S. Cl. ............................................................. 363/21
[58] Field of Search ................................ 363/21, 37, 81, 363/89, 127, 56, 17; 323/222

[56] References Cited

U.S. PATENT DOCUMENTS

| | | | |
|---|---|---|---|
| 4,553,199 | 11/1985 | Harada et al. | 363/75 |
| 5,543,704 | 8/1996 | Thoren | 323/222 |
| 5,636,114 | 6/1997 | Bhagwat et al. | 363/56 |
| 5,652,700 | 7/1997 | Tsai et al. | 363/21 |
| 5,764,494 | 6/1998 | Schutten et al. | 363/17 |
| 5,790,389 | 8/1998 | Hua | 363/20 |
| 5,815,386 | 9/1998 | Gordon | 363/50 |

*Primary Examiner*—Adolf Deneke Berhane
*Attorney, Agent, or Firm*—Charles A. McClure

[57] ABSTRACT

Single-stage switched AC/DC converters are provided with a PFC (power factor correction) lead enhanced by inclusion of a saturable reactor and/or by connecting the PFC lead to an intermediate tap in a primary winding of the customary isolation transformer located in the DC/DC conversion part of the converter. An important resulting improvement is reduction in the voltage stress on the energy-storage (or "bulk") capacitor. Included are various circuit arrangements of resetting the saturable inductor, for designer or user selection.

20 Claims, 6 Drawing Sheets

SINGLE-STAGE AC/DC CONVERTERS WITH SATURABLE CONDUCTOR PFC

TECHNICAL FIELD

This invention relates to AC/DC power conversion, and concerns improved power factor correction (PFC) in single-stage converters.

BACKGROUND OF THE INVENTION

Development of soft-switching power supplies began strongly in the decade of the 1980's and has continued meanwhile. Single-stage consolidation including PFC correction began mainly in the 1990's. Many resulting designs have appeared in patents, and others have been made the subject of publication in technical journals. Yet significant trade-offs are inherent in known designs, such as voltage stress upon the customary energy storage ("bulk") capacitor as power factor approaches the desired value of unity.

Such a trade-off is a common problem in such designs, including my own contributions, as well as those of other contributors to this art. Representative examples appear in consolidated or single-stage AC/DC converters patented by such noted designers as the following:

Fraidlin, Slack, and Wadlington in U.S. Pat. No. 5,115,182 (1992) for *Single Conversion Power Factor Correction using SEPIC Converter*, providing a design with unity power factor but with low-frequency ripple in the output and with slow transient response; and Teramoto, Sekine, and Saito in U.S. Pat. No. 5,301,095 (1994), for *High Power Factor AC/DC Converter*, a PFC corrective design with a sole high-frequency capacitor but wherein the primary diode undergoes hard switching unsuited to high-frequency operation, and with input and load ranges narrow without extensive frequency modulation; and Tsai, Poon, Ho, and Lee in U.S. Pat. No. 5,652,700 (1997), for *Low Cost AC-to-DC converter Having Input Current with Reduced Harmonics*, a single-stage PFC AC/DC converter with multiple primary windings on an isolation transformer (a primary in the rectified positive lead) in the converters in the first dozen drawing sheets—but not in the featured final (13th) sheet or in any of the claimed circuitry; their energy storage or "bulk" capacitor is so voltage-stressed that a 450 V AC rating is needed for a universal (90 to 264 VAC) input range to obtain even an 0.8 power factor, and subject to a pulsating input current, with high switching AC ripple requiring optimal EMI filtration, and its primary diode undergoing hard switching; and Brkovic & Cuk, in U.S. Pat. No. 5,642,267 (1997), for *Single-Stage, Unity Power Factor Switching Converter with Voltage Bidirectional Switch and Fast Output Regulation*, a single-stage PFC AC/DC Cuk converter with a saturable inductor ("magnetic amplifier") as a bidirectional switch to improve the input current waveform, although capable of providing perfect power factor, having its input current operating in deep discontinuous mode, requiring a large EMI filter, with low efficiency owing to high switch-current stress, plus a costly and complicated controller including multipliers and dividers; the bulk capacitor voltage stress, although tightly regulated over the entire line and load range, has to be significantly greater than the maximum peak rectified line voltage (above 450 V for universal input).

Notable examples of contributions to technical (but not patent) literature in this general field have included the following:

Madigan, Erickson, and Ismail, *Integrated High Quality Rectifier-Regulators*, PESC '92 Record, about BIBRED (and BIFRED) designs having very good power factor and regulation but relatively poor efficiency and excessive voltage stress on the bulk capacitor;

Redl, Balogh, and Sokal, *A New Family of Single-Stage Power-Factor Correctors with Fast Regulation of the Output Voltage*, PESC '94 Record, teaching power factor correction with a sole inductor, but imposing high switching stresses because of deep discontinuous conduction operating mode and requiring a large EMI filter; and Huber and Jovanovic, *Single-Stage, Single-Switch Isolated Power Supply Technique with Input-Current Shaping and Fast Output-Voltage Regulation for Universal Input-Voltage-Range Operations*, IEEE APEC 1997 Proceedings, describing a converter reasonably capable of 0.9 power factor with a 450 V capacitor but necessitating a complicated power transformer with at least three primary windings, depending heavily upon leakage inductance, very resistant to adequate control.

A U.S. patent to issue (in 1998) upon my application Ser. No. 08/657,615 for *Consolidated Soft-Switching AC/DC Converters* discloses a family of converters able to provide good power factor, good efficiency, and also continuous input current while maintaining reasonably low energy-storage capacitor voltage stress, but also subject to such a trade-off between bulk capacitor voltage stress and power factor, whereby the higher the power factor, the greater the voltage stress.

Accordingly, my present effort is to improve further upon the design of single-stage AC/DC converters, especially in that regard.

SUMMARY OF THE INVENTION

A primary object of the present invention is to limit the voltage stress imposed upon the customary bulk capacitor of single-stage AC/DC converters while also attaining good power factor correction;

Another object of this invention is to use a saturable reactor to limit the voltage stress upon the bulk capacitor of a converter;

A further object is to enable a choice of several ways to reset such a saturable reactor subjected to high-frequency switching;

Yet another object of this invention is to provide a family of circuit designs by which the foregoing objectives are attained; and A still further object of the invention is to accomplish the various objects both economically as well as effectively.

In general, the objects of this invention are attained by means of improved content of PFC leads and accompanying circuitry in such switched AC/DC converters, by connecting such PFC lead to a tap on a primary winding of the isolation transformer of a component DC/DC converter, and by including in the PFC lead a saturable inductor and coupling it to a pre-existing inductor as on a ferromagnetic core, or by including a so-called "mag-amp"—wherein a saturable inductor and its control winding are prewound on a common ferromagnetic core.

More particularly, such circuitry, operating in accordance with the methods of this invention, safeguards the bulk capacitor from excessive peak voltage. Several circuitry arrangements are described for resetting a saturable inductor, whether by coupling it with a pre-existing inductive winding, or utilizing a mag-amp combination. A couple types of component DC/DC converters are illustrated also.

Other objects of this invention, together with methods and means for attaining the various objects, will become apparent from the following description and the accompanying diagrams of more than one embodiment, presented by way of example rather than limitation.

Saturable inductors or Mag-Amps are known as useful in the DC output circuitry of various converters, shown by (U.S.) patentees:

Jitaru, in U.S. Pat. No. 5,126,931 (1992) for *Fixed Frequency Single Ended Converter Switching at Zero Voltage*; Farrington, Jovanovich, and Lee in U.S. Pat. No. 5,325,283 (1994) for *Novel Zero-Voltage-Switching Family of Isolated Converters*; and also Vinciarelli, in U.S. Pat. No. 5,432,431 (1995) for *Boost Switching Power Conversion Using Saturable Inductors*.

The present inventor also has participated as co-inventor with Fred C. Lee in such output-oriented use of a saturable inductor, in U.S. Pat. No. 5,262,930 (1993) for Zero-Voltage Transition PWM Converters; U.S. Pat. No. 5,418,704 (1995) for Zero-Voltage-Transition Pulse-Width-Modulated Converters; and U.S. Pat. No. 5,442,540 (1995) for *Soft-Switching PWM Converters*.

Notably, only one of the foregoing documents (Brkovic & Cuk) discloses a saturable inductor in the input to a DC/DC converter section of an AC/DC converter, but its excessively complex requirements preclude it from effectively meeting the requirements of many users.

DESCRIPTION OF THE INVENTION

Figure 1:
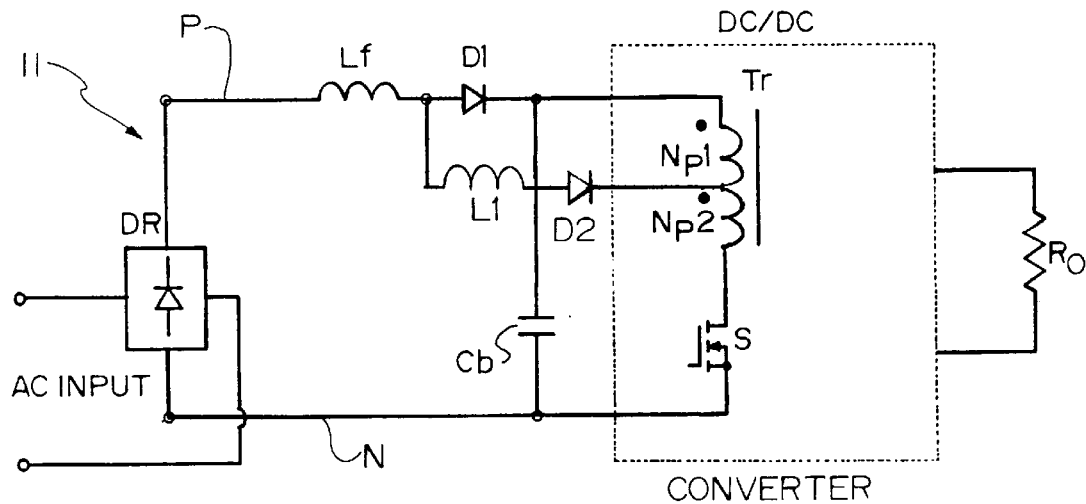
FIG. 1 is a schematic circuit diagram of a pertinent example of a predecessor converter, in general form, featuring a PFC lead to an isolation transformer of the DC/DC section of an AC/DC converter.

FIG. 1 shows, in schematic circuit diagram form, a predecessor single-stage AC/DC converter 11 comprising diode rectifier DR having an AC input at the left, with rectified positive lead P and negative (or neutral) lead N to the right, bridged by bulk (energy storage) capacitor Cb. Both leads terminate in a component DC/DC Converter (dotted outline) enclosing isolation transformer Tr. For simplicity this view omits any secondary winding and output circuitry, which may take any of many conventional forms. Electrical load Ro is shown bridging a pair of leads rightward from the dotted outline.

High-frequency switch S (externally controlled) is connected between lead N and the low end of a primary winding divided by a tap into a first part with $N_{P1}$ turns and a second part with $N_{P2}$ turns. The positive lead contains filter inductor Lf and steering diode D1 on its way to the top end of the primary winding as is customary.

The foregoing components are conventional for AC/DC converters lacking a PFC (power factor correction) lead. However, FIG. 1 also includes such a lead, starting from the junction of inductor Lf and diode D1 in the positive lead. This PFC lead contains inductor L1, then series diode D2, and connects to a tap on the primary winding.

Figure 2:
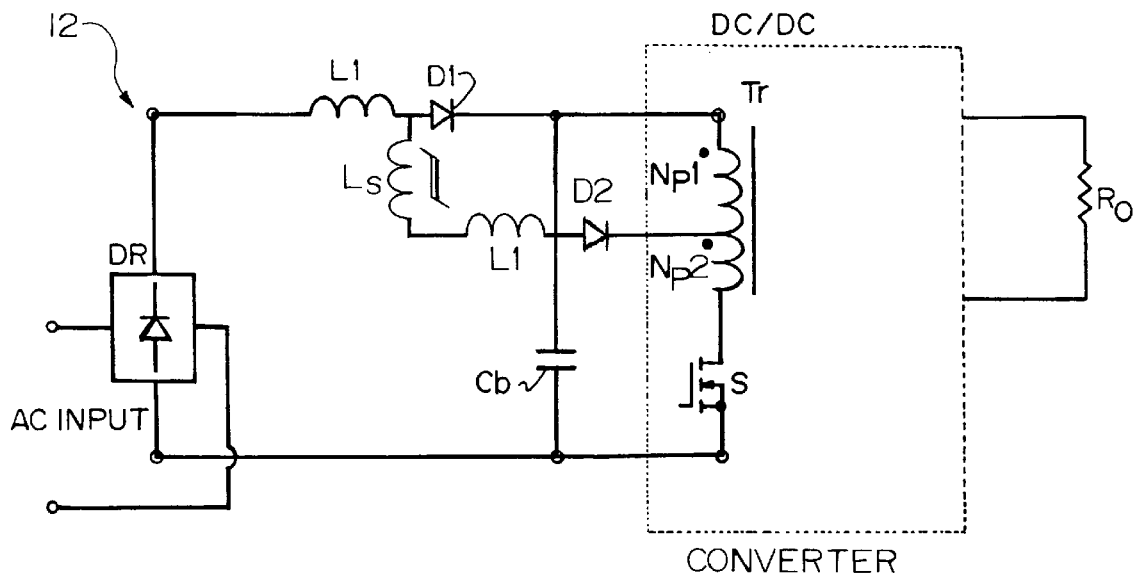
FIG. 2 is a schematic circuit diagram of a generalized first embodiment of the present invention differing from the circuitry of FIG. 1 by addition of a saturable inductor to the PFC lead.

FIG. 2 shows, in similar schematic form, a first embodiment 12 of the present invention, differing from FIG. 1 solely by including saturable inductor Ls (and adjacent stylized hysteresis loop symbol) ahead of L1 in the PFC lead. The purpose of the saturable inductor, in whatever form, is considered further below.

Figure 3:
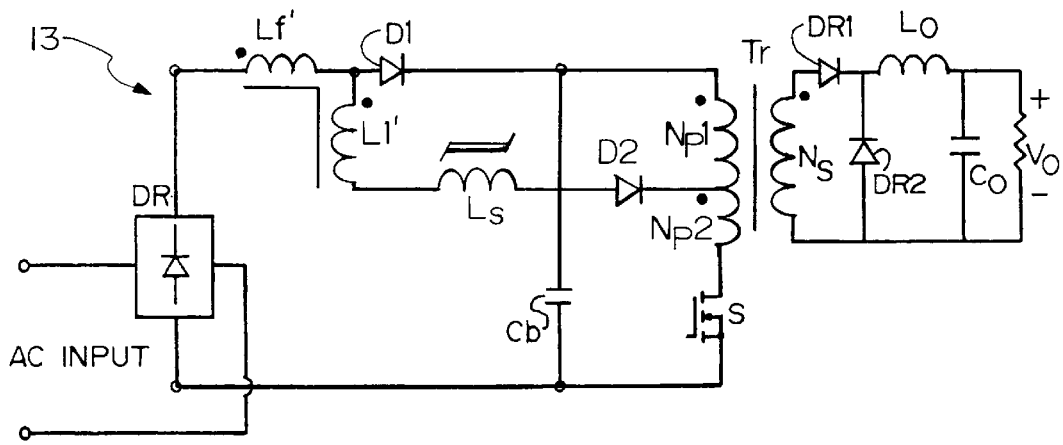
FIG. 3 is a schematic circuit diagram of another embodiment of single-stage AC/DC converter according to this invention, wherein an inductor precedes the saturable inductor in the PFC lead and shares a ferromagnetic core with the filter inductor in the positive lead, and with its component DC/DC converter in customary forward form.

FIG. 3 shows, in similar schematic form, variant embodiment 13 differing from the previous embodiment by interchanging the order of the inductors in the PFC lead. Whereas inductor L1 followed Ls in FIG. 2, here Ls is preceded by redesignated inductor L1'—sharing a common ferromagnetic core, designated by line segments paralleling the respective inductors and joined at a right angle. This magnetic coupling of the inductors enables energy stored in L1' to transfer to Lf when switch S is turned OFF, and thereby enables the forward type of DC/DC converter to operate without a separate reset winding on the transformer—such as is shown in some subsequent views.

Figure 4:
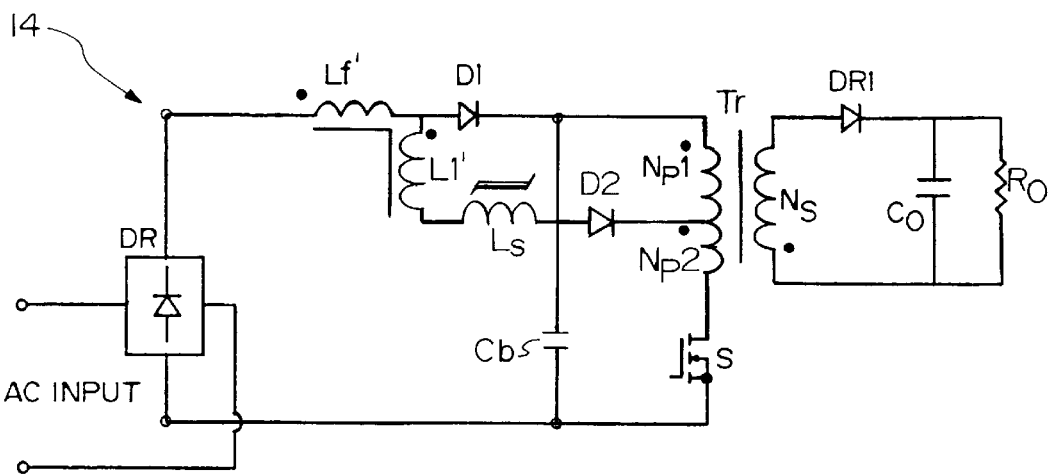
FIG. 4 is a schematic circuit diagram like that of FIG. 3, wherein its component DC/DC converter is in customary flyback form.

FIG. 4 shows variant single-stage AC/DC converter 14 embodiment of this invention, like that in FIG. 3 except that its component DC/DC converter is of flyback type, which operates satisfactorily.

Figure 5:
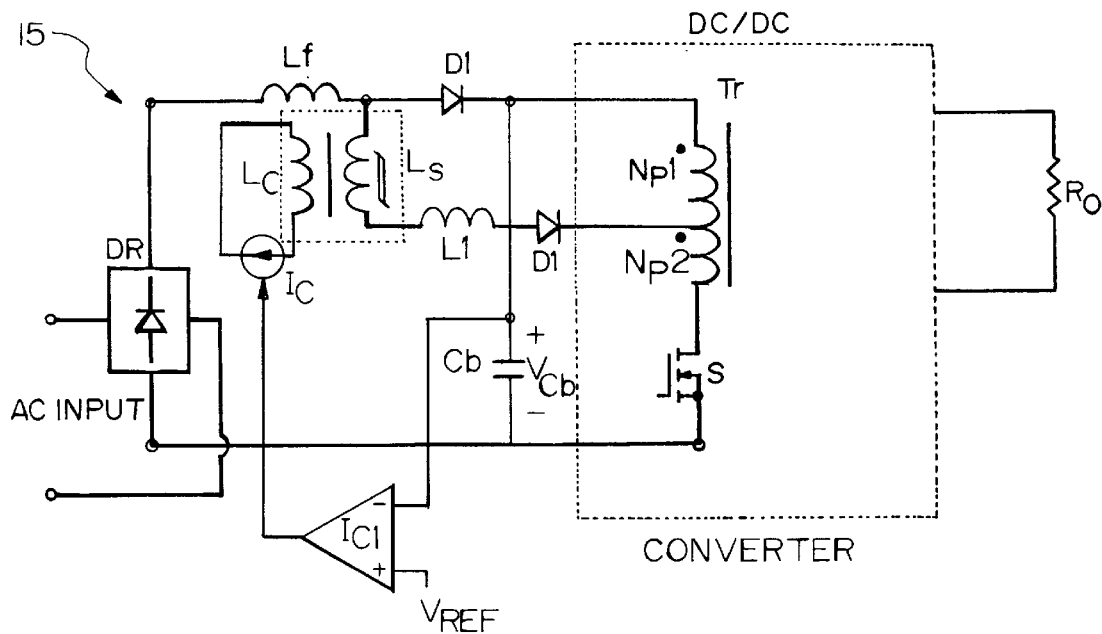
FIG. 5 is a schematic circuit diagram differing from FIG. 2 by addition of a control winding magnetically coupled to the saturable inductor in mag-amp configuration.

FIG. 5 shows another embodiment 15 of this invention, differing from the embodiment of FIG. 2 by addition of a control winding Lc to Ls on a common ferromagnetic core—surrounded by a dotted outline. Lc is in a closed loop with variable-current source controlled by the output from operational amplifier IC1 having comparative inputs: positive lead voltage on Cb, and an external reference voltage Vref.

Figure 6:
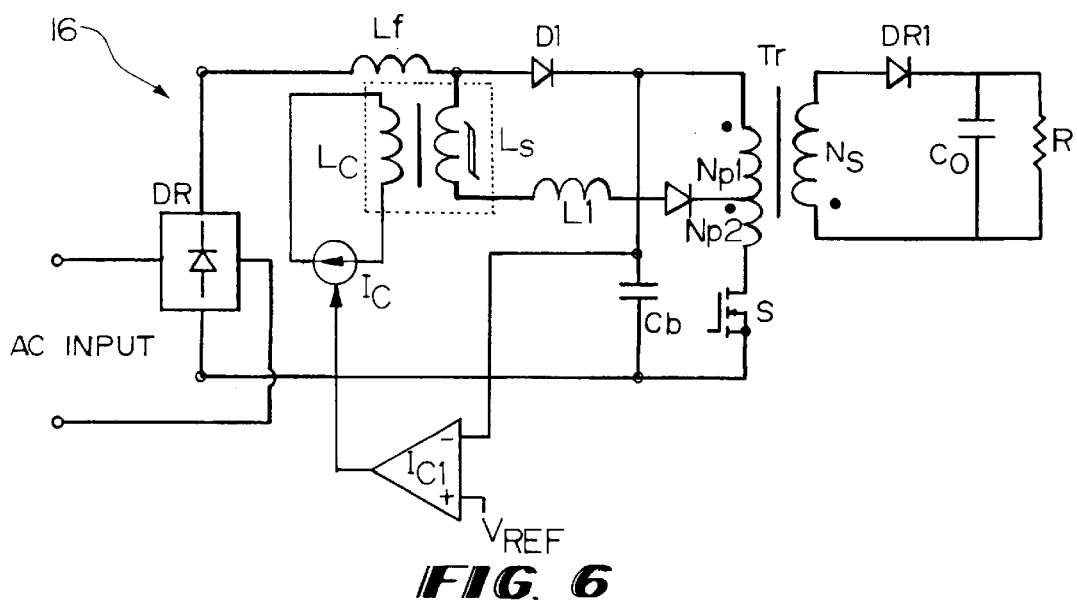
FIG. 6 is a schematic circuit diagram differing from FIG. 5 by completion of its component DC/DC converter in flyback form.

FIG. 6 shows schematically embodiment 16, like that of FIG. 5 except that the component DC/DC converter is of flyback type. Thus, no further description of it is needed here.

Figure 7:
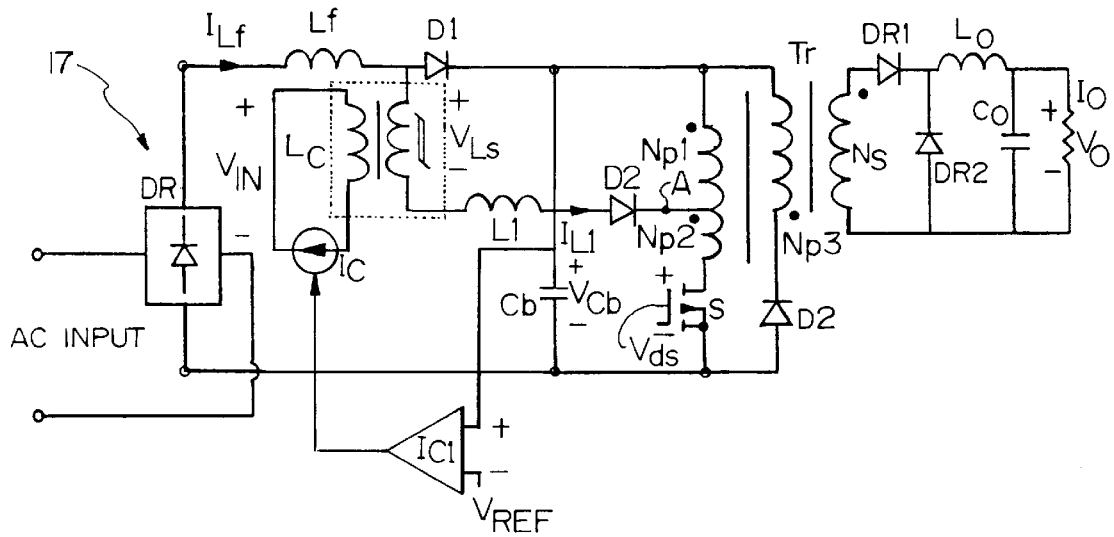
FIG. 7 is a schematic circuit diagram differing from FIG. 5 by completion of its component DC/DC converter in forward form, and with a second or reset primary winding in the customary isolation transformer—including notation of various voltages and currents.

FIG. 7 similarly shows embodiment 17, like that of FIG. 5 but with the component DC/DC converter shown as of forward type, and with the transformer including another primary winding having Np3 turns. This view adds informative designation of currents in given circuit elements, by the letter I (with a matching subscript), and designation of voltages by the letter V (with matching subscripts).

Figure 8:
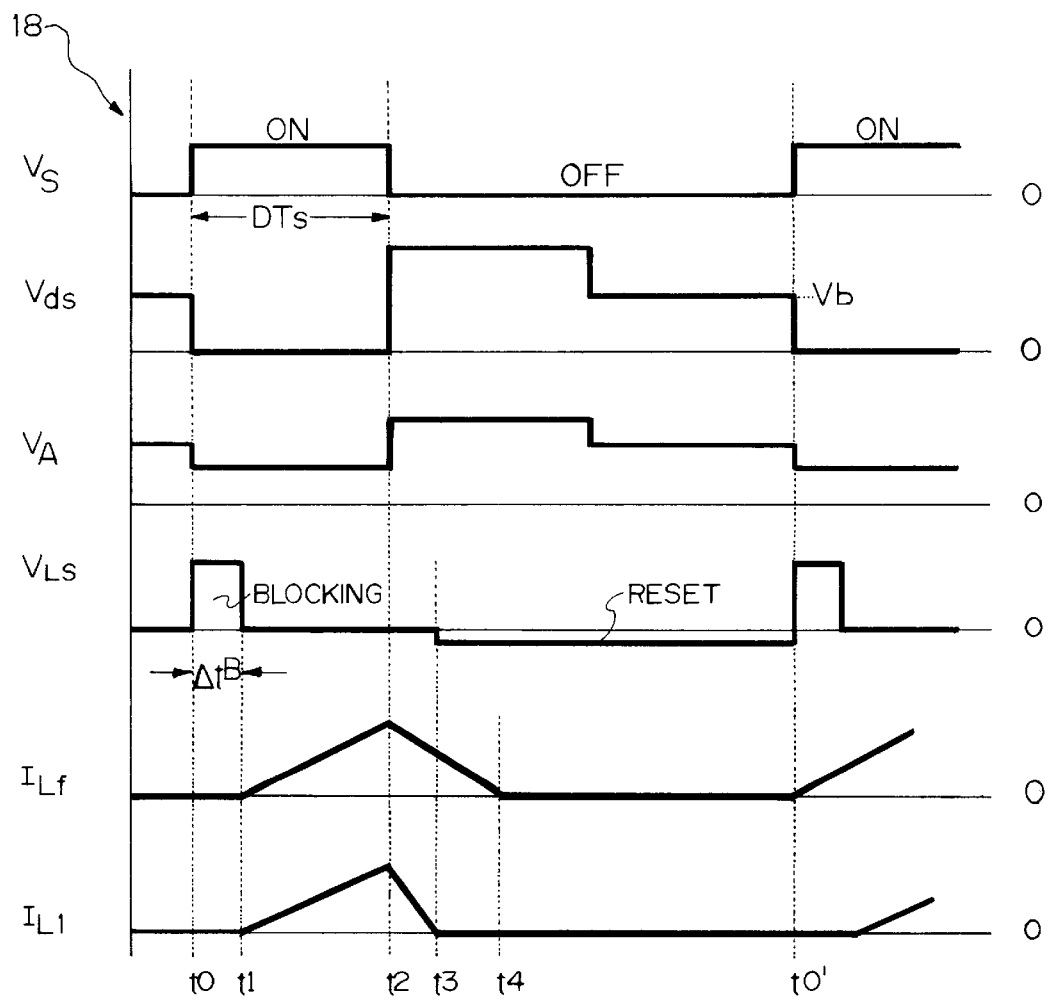
FIG. 8 is a graphical representation of the various voltages and currents of FIG. 7 over a cycle of high-frequency switching.

FIG. 8 is a graphical representation (18) of selected currents and voltages over a complete high-frequency cycle of operation of the FIG. 7 embodiment, indicated at times: t0, t1, t2, t3, t4, and then t0' (the start of the next cycle).

Shown from top in this graphical view are these voltage cycles:

$V_S$—gate control input to MOSFET high-frequency switch S;

$V_{ds}$—drain-to-source voltage of switch S;

$V_A$—applied at tap point A on transformer primary winding; and $V_{Ls}$—across saturable inductor Ls.

Shown underneath the above voltages are these current cycles:

$I_{Lf}$—through filter inductor Lf; and $I_{L1}$—through PFC inductor L1.

A cycle of operation is described time segment by time segment:

Just before starting time t0, switch S is OFF, and both Lf and L1 have no current flowing therethrough. Mag-Amp Ls has been reset.

[t0–t1] At t0, switch S is turned ON, and $V_{ds}$ drops to zero. $V_A$ at the primary winding tap becomes $(N_{P2}/N_P)/V_{Cb}$. Throughout this time period, Ls is unsaturated, and thus acting as a high-impedance device (much like an open circuit). The voltage across Ls is equal to $V_{IN}-(N_{P2}/N_P)V_{Cb}$. Voltages across Lf and L1 approximate zero. Accordingly, currents $I_{Lf}$ and $I_{L1}$ remain substantially zero. As noted below, the duration of this first time period depends upon how long (as in volt-seconds) mag-amp action precludes Ls from becoming saturated—or how much reset was provided to Ls in the S OFF period. This time period ends and the next begins when Ls becomes saturated.

[t1–t2] Ls saturation reduces its inductance to nearly zero. Both currents $I_{Lf}$ and $I_{L1}$ ramp up at a rate of $dI_{Lf}/dt=I_{L1}/dt$, equal to $[V_{IN}-V_{Cb}(N_{P2}/N_P)/(Lf+L1)]$. Steering diode D1 is reverse-biased and non-conducting during this time period. The peak value for both these currents is reached at the end of the period (S switches OFF): $I_{Lf}^{pk}=I_{L1}^{pk}=(DT_S-t_B)[V_{IN}-V_{Cb}(N_{P2}/N_P)]/(Lf+L1)$, where D is the duty cycle of switch S, whereas $T_S$ is the switching period, and $\Delta t_B$ is the blocking time of the mag-amp (before Ls becomes saturated). Of course, for a given duty cycle D, the longer the Ls blocking time is, the lower the peak current through Lf and L1 will become.

[t2–t3] Switch S is turned OFF at t2, so the voltage across S rises quickly to $1+V_{Cb}(N_P/N_{P3})$ (where $N_{P3}$ is the number of turns on the transformer (added) reset primary winding), whereupon $V_A$, the voltage at A, the primary tap, equals $V_{Cb}[1+(N_{P1}/N_{P3})]$. As a result both $I_{Lf}$ and $I_{L1}$ decrease. Depending on Lf and L1 inductance values, as well as the instantaneous line voltage, the changing rates of $I_{Lf}$ and $I_{L1}$ may or may not be identical during this time period.

If the condition $(V_{Cb}-V_{IN})/Lf \geq (N_{P1}/N_{P3}) (V_{Cb}/L1)$ is satisfied, both currents $I_{Lf}$ and $I_{L1}$ will decay to zero at identical rates:

$dI_{Lf}/dt=dI_{L1}/dt=[V_{Cb}+(N_{P1}/N_{P3})V_{Cb}-V_{IN}]/(Lf+L1)$.

In this special case, diode D1 remains non-conducting throughout the entire switching cycle, and both $I_{Lf}$ and $I_{L1}$ decay to zero at the same rate—and, of course, then reach zero at the same time (t3).

But if the condition $(V_{Cb}-V_{IN})/Lf \geq (N_{P1}/N_{P3}) (V_{Cb}/L1)$ is not met, then $I_{Lf}$ will decrease faster than $I_{L1}$, in accord with the following:

$dI_{Lf}/dt=(V_{Cb}-V_{IN})/Lf$ and $dI_{L1}/dt=(N_{P1}/N_{P3}) (V_{Cb}/L1)$.

The current difference between $I_{Lf}$ and $I_{L1}$ flows into energy-storage capacitor Cb through diode D1, and $I_{L1}$ decays to zero before $I_{Lf}$.

[t3–t4] This is a distinct operating stage only if the last equation is not satisfied. After $I_{L1}$ decays to zero at time t3, PFC diode D2 becomes reverse-biased, and $I_{Lf}$ continues to decrease at the rate in the immediately preceding equation, until reaching zero. During this time period, Ls begins to reset and becomes unsaturated.

Mag-amp resetting can be controlled in a number of ways, and FIG. 7 shows resetting by applying a current source Ic to control winding Lc. Precisely when the reset waveform will appear can vary within the time period t3–t0' but the maximum reset voltage applied to Ls will be limited to $(N_{P1}/N_{P3})V_{Cb}$ (otherwise D2 would start to conduct again). The impact Ls has on the operation or performance of the converter is determined essentially by the volt-seconds applied to Ls when $I_{LS}$ is zero (i.e., within time period t3–t0'). The total reset volt-seconds applied to Ls will determine how many volt-seconds Ls can block conduction, or how long $\Delta B$ will be when S is next turned ON in the next ensuing switching cycle.

[t4–t0] Both $I_{Lf}$ and $IP_{L1}$ remain at zero during this time period. Note in FIG. 8 the implicit assumption that the forward transformer will complete reset (when $V_{ds}$ voltage steps down) within this time period. In a real circuit, the forward transformer could complete reset before $I_{Lf}$ reaches zero, whereupon the $I_{Lf}$ waveform will appear a bit different than as shown there, but the principle of operation remains fundamentally the same. As already noted, time t0', S is turned ON again, and the cycle is repeated.

Figure 9:
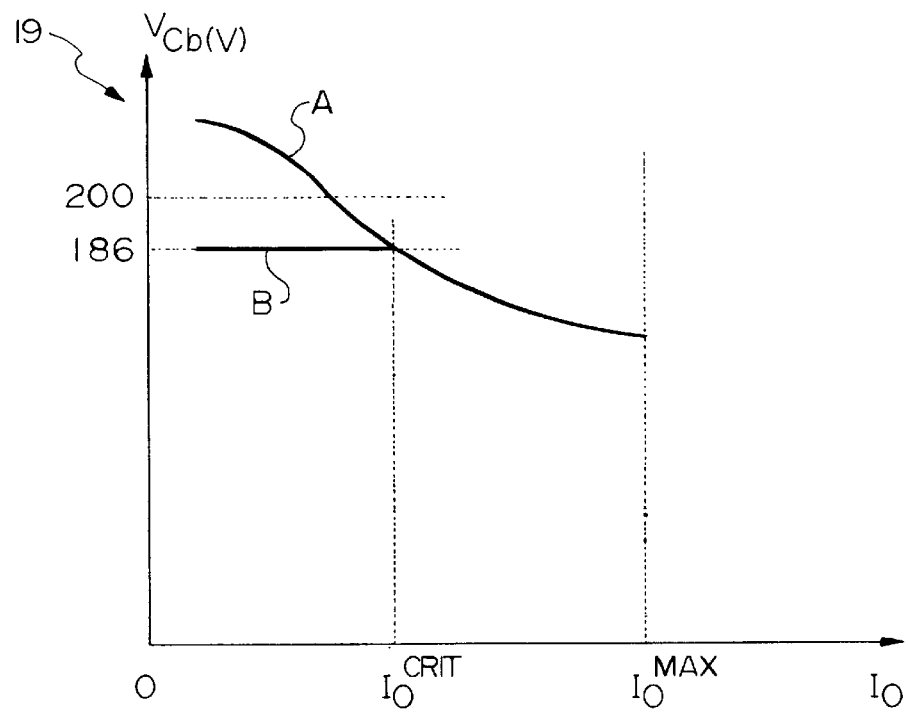
FIG. 9 is a graphical representation of bulk capacitor voltage $V_{Cb}$ vs. output or load current Io in the FIG. 7 converter.

FIG. 9 shows a typical graph (19) of $V_{Cb}$ vs. Io output/load current for the FIGS. 6–8 converter with and, alternatively, without saturable inductor Ls when operating over a North American input voltage range (90–132 VAC). Curve A corresponds to the circuit without using Ls. For a given line voltage, $V_{Cb}$ increases as Io decreases. For such voltage range, typical maximum $V_{Cb}$, assuming (again) high line voltage and light load, is between 220 and 250 V, if the converter is designed to meet the IEC 1000-3-2 input harmonic requirement, which requires a power factor of about 0.8 or more. Needed would be a 250 V or 300 V capacitor (Cb), and a 500 V or 600 V MOSFET as the high-frequency power switch.

Alternatively, Curve B corresponds to operating the converter with a saturable inductor added according to the present invention. For the same 90–132 VAC input range, $V_{ref}$ can be set at about 186 V, which is close to the maximum peak voltage. When the load current is heavy, $V_{Cb}$ is below $V_{ref}$, and op-amp IC1 commands the current source Ic to remain at zero, whereupon Ls stays saturated over the entire switching cycle and behaves like a very small inductor (Ls residu the same as in the absence of Ls. $V_{Cb}$ increases as Io decreases, and the curve of $V_{Cb}$ vs. Io essentially repeats Curve A.

As the load current decreases to a critical level, $Io^{crit}$ (which is line-voltage-dependent so that the higher the RMS line voltage, the lower the relative $Io^{crit}$), $V_{Cb}$ reaches its threshold voltage, $V_{ref}$. Op-amp IC1 starts to generate an output for Ic to increase, and Ls is provided a degree of reset to reduce the input current and suppress $V_{Cb}$. As Io continues to decrease, Ic increases and becomes able to provide more reset to Ls. As long as the IC1 control loop has a high enough DC gain, the maximum $V_{Cb}$ will be clamped to a value very close to $V_{ref}$.

With the maximum $V_{Cb}$ reduced to about 186 V, a 200 V capacitor as $V_{Cb}$, and a 400 V MOSFET (with significantly lower ON-resistance than a 500 V or 600 V one) as the power switch, improving the efficiency of the converter and reducing its cost, as compared to a converter without the saturable reactor.

Figure 10:
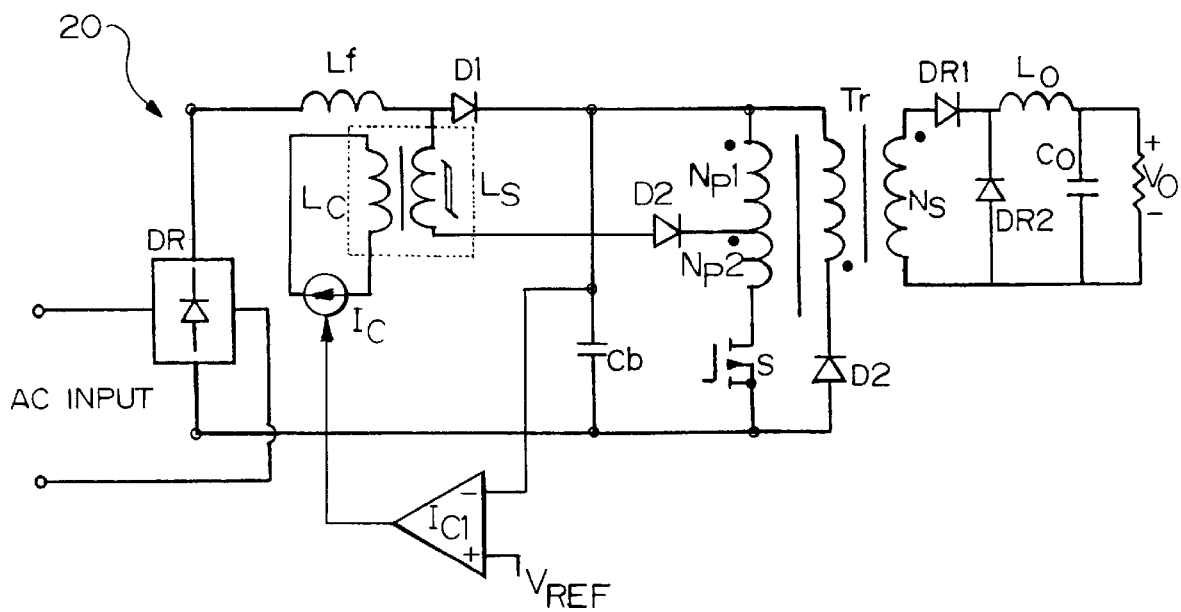
FIG. 10 is a schematic circuit diagram differing from that of FIG. 7 by omission of separate inductor L1 from the PFC lead.

FIG. 10 shows schematically embodiment 20, like that of FIG. 7 but lacking a separate inductor following Ls in the PFC lead. Reset winding (NP$_3$ becomes optional due to lack of the separate inductor. Although the design flexibility is somewhat reduced, compared to the converter in FIG. 7, this FIG. 10 circuit saves an inductor. For universal (90–264 VAC) input range, the bulk capacitor can expect to see a maximum voltage of about 430–450 V without saturable inductor Ls, which is reducible to about 380 V by addition of Ls.

Figure 11:
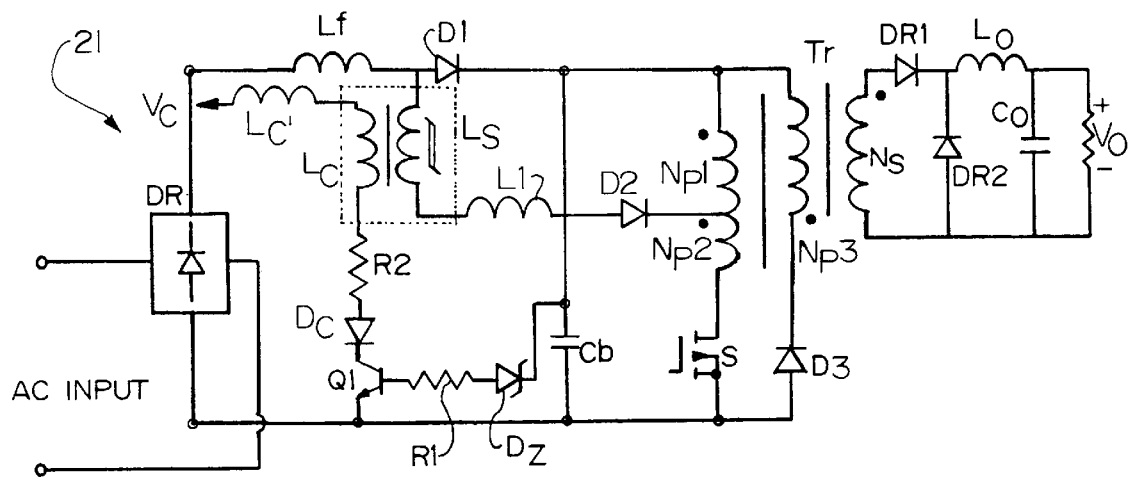
FIG. 11 is a schematic circuit diagram of a converter much as in FIG. 3 but with modified saturable inductor control.
Figure 12:
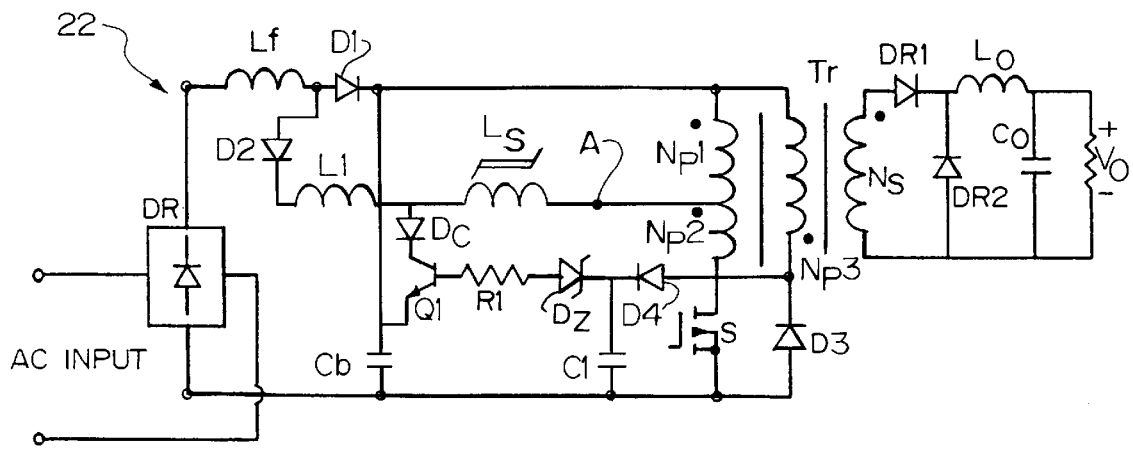
FIG. 12 is a schematic circuit diagram of a similar converter with control differing somewhat further than in FIG. 11.

As already noted, reset of Ls can be provided in numerous ways. FIGS. 11 and 12 show respective forward converter embodiments 21 and 22 of this invention with modified reset circuitry, based (in each instance) on a few low-cost components forming a reset module variously connected in the respective views. The reset module features a transistor Q1, having a gate resistor R1 preceded by a zener diode $D_Z$, connected to a source of activation threshold voltage, and connecting via its emitter to a dissimilar voltage, and via its collector to the saturable inductor via a control diode Dc.

In FIG. 11, the PFC winding includes saturable inductor Ls in mag-amp configuration with control winding Lc, inductor L1, and diode D2. External control voltage Vc is provided through inductor Lc' to one end of the control winding, whose other end connects through an added resistor R2 to the control diode of the module. The module's emitter is tied to the negative lead, and its base via the zener diode to the positive lead, setting a threshold voltage (similar to Vref in FIG. 9). At low line and heavy load, $V_{Cb}$ is below zener diode voltage $V_{Dz}$; Q1 remains OFF, and Ls is not reset. $V_{Cb}$ increases as line voltage increases, or load current decreases, until it becomes high enough to overcome the $D_z$ threshold voltage to activate Q1. Then control winding Lc receives reset current, and Ls is reset during the power switch S OFF period. Proper selection of R1 and R2 enables maximum $V_{Cb}$ to be clamped to a value close to $V_{Dz}$.

Operation of FIG. 11 converter 21 was verified experimentally by a circuit with a 90–132 VAC input and 10 V regulated output. The load current can vary between 0 and 6.5 A. Part numbers/parameters were as follows: S—IRF840; Lf—18 uH; L1—30 uH, Cb—150 uF; D1, D2—BYV26A; DR1, DR2—16CTQ100; Lo—65 uH, Co—390 uF; Q1—2N22222A; Lc—2 mH; Dz—180 V; R1—5.1 kohm; R2—360 ohm. Ls is implemented on a Toshiba "MS" series amorphous saturable core, MS 21×14× 4.5 W, with 42 turns for the main winding and 16 turns for the control winding. The transformer is implemented on a TDK PC40-LP32/13 core and has 15 turns for $N_{P1}$, 40 turns for $N_{P3}$, and 11 turns for the $N_S$ winding. The switching frequency is 100 kHz. The converter was tested first without Ls. At high line (132 VAC) and light load, the measured maximum Cb stress was about 230 V. After adding Ls and its associated control circuitry, the measured maximum Cb stress was reduced to about 183, which is slightly lower than the maximum peak voltage (186 V) because of component parasitics (such as the forward voltage drop of the input bridge rectifier diodes). In both cases, the power factor at nominal line (110 VAC) and maximum load is about 0.8, and the input harmonic currents are below IEC 1000-3-2 limits.

The foregoing experimental results agree well with theory, and are more important than my theoretical views, as the latter could be erroneous, and are unnecessary for understanding and successfully practicing the invention as described in several embodiments here.

In FIG. 12, the PFC lead from the positive lead to primary winding tap A contains diode D2, inductor L1, and saturable inductor Ls. Here the module emitter is tied to the positive lead, its control diode Dc connects from the junction of L1 and Ls, and its zener diode is connected to diode D4, their junction being separated from the negative lead by capacitor C1, and D4 connects to the junction of the reset primary winding with diode D3 from the negative lead. Thus, diode D4 and capacitor C1 detect the voltage across diode D3: $[(1+N_{P3}/N_{P1}+N_{P2})]V_{Cb}$ when S is turned ON. Selection of threshold voltage of zener diode Dz at $(N_{P3}/N_{P1}+N_{P2})]V_{Cb}$ will keep Q1 OFF when $V_{Cb}$ is less than $V_{ref}$, and will be activated to suppress Cb voltage when $V_{Cb}$ reaches $V_{ref}$ and Dz breaks down. When S is turned OFF, the voltage at tap point A equals $[1+(N_{P1}/N_{P3})]V_{Cb}$, which is higher than the voltage ($V_{Cb}$) at the emitter of Q1. Therefore, depending upon how strongly Q1 is turned ON when Dz breaks down, a reset voltage will be applied to Ls during the S switch OFF period. When Q1 is fully ON, Ls can receive a maximum reset voltage of $(N_{P1}/N_{P3})V_{Cb}$. In comparison with the reset circuitry of FIG. 11, the reset circuitry of FIG. 12 saves a second winding but requires a transistor with a higher voltage rating. Both reset embodiments are simply effective.

As most such converters necessitate design trade-offs between maximum bulk capacitor and power factor, the transformer primary PFC tap and a saturable inductor is a substantial advance because it enables capacitor stress reduction at good power factor.

Preferred embodiments and variants have been suggested for this invention. Such concepts and circuitry are not only useful for single-stage AC/DC converters with PFC as illustrated and described here but can be extended to other DC/DC topologies than flyback and forward, including such as SEPIC and Cuk types, for example.

Other modifications may be made, as by adding, combining, deleting, or subdividing compositions, parts, or steps, while retaining all or some of the advantages and benefits of the present invention—which itself is defined in the following claims.

I claim:

1. In a single-stage AC/DC converter including a rectified positive lead to an end of a primary winding of a component DC/DC converter isolation transformer having also a secondary winding, the opposite end of the primary winding connecting to a high-frequency switch connecting in turn to a rectified negative (or neutral) lead, and a bulk (or energy storage) capacitor bridging the positive and negative leads;
   the improvement, conducive to limitation of voltage stress on the bulk capacitor, comprising a PFC (power factor correction) lead containing a saturable inductor and connecting from the positive lead to a tap on the primary winding, between its ends.

2. Single-stage AC/DC converter improvement according to claim 1, wherein the tap is located up to about four-fifths of the winding length from its end connected to the switch lead.

3. Single-stage AC/DC converter improvement according to claim 1, wherein the positive lead to an end of the primary winding contains a steering diode after its junction with the PFC lead and optionally a separate filter inductor before that junction.

4. Single-stage AC/DC converter improvement according to claim 3, wherein the PFC lead includes a series diode between the saturable reactor and the primary winding tap and optionally a further inductor between the saturable inductor and the diode.

5. Single-stage AC/DC converter improvement according to claim 3, wherein the DC/DC converter is of flyback type.

6. Single-stage AC/DC converter improvement according to claim 3, wherein the DC/DC converter is of forward type.

7. In a single-stage AC/DC converter including a rectified positive lead to an end of a primary winding of a component DC/DC converter isolation transformer having also a secondary winding, the opposite end of the primary winding connecting to a switching high-frequency source connecting in turn to a rectified negative (or neutral) lead, and a bulk (or energy storage) capacitor bridging the positive and negative leads;

the improvement, conducive to limitation of voltage stress on the bulk capacitor, comprising a PFC (power factor correction) lead containing a saturable inductor and connecting from the positive lead to a tap on the primary winding; and saturable reactor reset control circuitry comprising a variable current source to a winding magnetically coupled to the saturable inductor, the variable current source being controlled by output thereto from an operational amplifier having as comparative inputs an external reference voltage and the positive voltage on the bulk capacitor.

8. In a single-stage AC/DC converter including a rectified positive lead to an end of a primary winding of a component DC/DC converter isolation transformer having also a secondary winding, the opposite end of the primary winding connecting to a switching high-frequency source connecting in turn to a rectified negative (or neutral) lead, and a bulk (or energy storage) capacitor bridging the positive and negative leads;

the improvement, conducive to limitation of voltage stress on the bulk capacitor, comprising a PFC (power factor correction) lead containing a saturable inductor and connecting from the positive lead to a tap on the primary winding, and a saturable reactor reset control module comprising a transistor having a gate resistor and zener diode connected to set a transistor activation threshold voltage, and connecting (via its emitter) to another voltage source and (via its collector) to the saturable inductor through a control diode.

9. Single-stage AC/DC converter improvement according to claim 8, the reset control module zener diode being connected to the positive lead, the emitter being tied to the negative lead, and the control diode being connected through a resistor from an inductive winding magnetically coupled to the saturable inductor.

10. Single-stage AC/DC converter improvement according to claim 8, the reset control module zener diode being connected to a first terminal of a capacitor whose other terminal is tied to the negative lead, the emitter being tied to the positive lead, and the control diode connected from (ahead of) the saturable inductor.

11. Single-stage AC/DC converter improvement according to claim 8, wherein the capacitor first terminal also is connected to a diode from an end of a second primary winding on the transformer.

12. In a single-stage AC/DC converter including a rectified positive lead containing a filter inductor and leading to an end of a primary winding of a component DC/DC converter isolation transformer having also a secondary winding, the opposite end of the primary winding connecting to a high-frequency switch connected in turn to a rectified negative (or neutral) lead, and a bulk (energy storage) capacitor bridging the rectified positive and negative leads;

the improvement, conducive to limitation of voltage stress on the bulk capacitor, comprising a PFC (power factor correction) lead containing a saturable inductor and connecting from an intermediate location on the positive lead to a tap on the primary winding located as much as about four-fifths of the winding length apart from its end connected to the switch lead.

13. Single-stage AC/DC converter improvement according to claim 12, wherein the PFC lead contains a diode in series with the saturable inductor.

14. Single-stage AC/DC converter improvement according to claim 13, wherein in the PFC lead also contains a separate inductor in series with the saturable inductor.

15. Single-stage AC/DC converter improvement according to claim 13, wherein the filter inductor in the positive lead and the separate inductor in the PFC lead share a ferromagnetic core.

16. Method for reducing voltage stress on a component bulk (energy storage) capacitor bridging rectified positive and negative (or neutral) leads of a single-stage AC/DC converter including a component DC/DC converter with an isolation transformer having a primary winding connecting from the positive lead and through a high-frequency switch to the negative lead;

comprising suppressing rise of voltage on that capacitor by the steps of inserting a power factor correction lead from a junction with the positive lead to a tap on the primary winding, and including a saturable inductor within the PFC lead.

17. Single-stage AC/DC converter produced by the method of claim 16, including the additional step of selecting a flyback type of DC/DC converter.

18. Single-stage AC/DC converter produced by the method of claim 16, including the additional step of selecting a forward type of DC/DC converter.

19. Method for reducing voltage stress on a component bulk (energy storage) capacitor bridging rectified positive and negative (or neutral) leads of a single-stage AC/DC converter including a component DC/DC converter with an isolation transformer having a primary winding connecting from the positive lead and through a high-frequency switch to the negative lead;

comprising suppressing rise of voltage on that capacitor by the steps of inserting a power factor correction lead from a junction with the positive lead to a tap on the primary winding, and including a saturable inductor in the PFC lead; and aiding resetting of the saturable reactor by the steps of connecting a variable current source to a winding magnetically coupled to the saturable reactor, and controlling the variable current by the difference between the voltage on the bulk capacitor and an external reference voltage.

20. Method according to claim 19, including the step of setting the reference voltage to approximately the maximum peak voltage of the instantaneous line voltage being rectified.

* * * * *

UNITED STATES PATENT AND TRADEMARK OFFICE
CERTIFICATE OF CORRECTION

PATENT NO.    : 6,118,673
DATED         : September 12, 2000
INVENTOR(S)   : Guichao Hua Page 1 of 1

It is certified that error appears in the above-identified patent and that said Letters Patent is hereby corrected as shown below:

The word CONDUCTOR in the second line of the Title is twice replaced by the word INDUCTOR First Occurrence:
Title page:
Item [54] at upper left, middle word in 2nd line of item [54];

Second Occurrence:
Column 1,
Middle word in line 2.

Signed and Sealed this

Eleventh Day of September, 2001

Attest:

NICHOLAS P. GODICI
Attesting Officer    Acting Director of the United States Patent and Trademark Office